United States Patent [19]

Paulk

[11] Patent Number: 5,186,541
[45] Date of Patent: Feb. 16, 1993

[54] NON-CONTACT INFRARED TEMPERATURE SENSING SYSTEM

[75] Inventor: Raymond C. Paulk, Hopedale, Mass.

[73] Assignee: Gentri Controls, Inc., Hopedale, Mass.

[21] Appl. No.: 780,716

[22] Filed: Oct. 21, 1991

[51] Int. Cl.⁵ .......................... G01J 5/10; G01N 25/00
[52] U.S. Cl. ..................................... 374/124; 364/557; 374/126; 374/153
[58] Field of Search .................. 374/9, 126, 153, 128, 374/124; 364/557

[56] References Cited

U.S. PATENT DOCUMENTS

| | | | |
|---|---|---|---|
| 4,558,959 | 12/1985 | Thomas et al. | 374/153 X |
| 4,765,752 | 8/1988 | Beynon et al. | 374/153 |
| 4,881,823 | 12/1989 | Tanaka et al. | 374/9 |
| 4,884,896 | 12/1989 | Conway | 374/9 |
| 4,919,542 | 4/1990 | Nulman et al. | 374/128 X |

FOREIGN PATENT DOCUMENTS 162028 12/1980 Japan ........................................ 374/9

OTHER PUBLICATIONS

"Determining Emissivity", Burton Benard, Instruments & Control Systems, pp. 87-89, (vol. 37, #5).

Primary Examiner—Daniel M. Yasich
Attorney, Agent, or Firm—Iandiorio & Dingman

[57] ABSTRACT

A non-contact infrared temperature sensing system for determining temperature values for a series of targets all having a similar emissivity value, which calculates an emissivity value for the targets based on the sensed total heat radiated from one target, an inputted temperature value for that target, and a temperature value for extraneous radiation from that target. The system then computes, for each subsequent target whose heat radiation is detected, a temperature value for each said target dependent upon the emitted component of radiation, and independent of the extraneous component of radiation from that target.

32 Claims, 5 Drawing Sheets

NON-CONTACT INFRARED TEMPERATURE SENSING SYSTEM

FIELD OF INVENTION

An improved non-contact infrared temperature sensing system which automatically computes temperature values for objects independent of any extraneous heat radiating from the targets not related to their temperature and independent of changes in the ambient environment.

BACKGROUND OF INVENTION

It is often useful, using established quality assurance techniques, to measure the temperature of a product by a sensing mechanism which does not actually contact the product. Presently available non-contact radiation detectors are currently used for this purpose. For example, in a given manufacturing process the proper temperature value for a product as it exits an oven may be established. It may then be desirable to monitor the temperature of the products as they leave the oven and adjust the oven accordingly if the monitored temperature deviates from the established temperature. Accordingly, non-contact radiation detectors are especially desirable in assembly line type manufacturing processes.

Non-contact infrared detectors are based on the principle that the thermal radiation emitted from a surface is proportional to the temperature of the surface raised to the fourth power. Thermal radiation detectors, such as thermopiles, sense the total thermal radiation emitted by a given target; a non-contact infrared sensing system can incorporate a thermopile and computing means to calculate a temperature value for the target based on the relationship between thermal radiation and temperature. Many of the presently available infrared detector systems are inaccurate, however, because they do not account for the fact that the temperature of the object is a function of the emissivity of the object's surface and of the other radiation which is independent of the temperature of the target. Excepting theoretical bodies at absolute zero temperature, all objects emit radiant heat from their surfaces which can include both emitted and extraneous radiation. Extraneous radiation is defined as any heat radiated from the object which is not related to the object's temperature. This includes reflected and transmitted heat. Emissivity, defined as the ratio of the actual emitted heat to the maximum theoretical emitted heat, can range from zero to unity for a given object. Therefore, to properly calculate the temperature of a given target object using a non-contact radiation detector, three variables must be known: the emissivity of the target, the value of the extraneous radiation and the total infrared radiation from the target (often expressed in British thermal units per target area over time). The well known Stefan-Boltzman equation may be used to mathematically define the interrelationship between these variables:

$$T_T = \left\{ \frac{1}{\epsilon}\left( \frac{R_T}{\sigma} - (1-\epsilon)T_R^4 \right) \right\}^{\frac{1}{4}} - 273.15$$

where $T_T$=the temperature of the target in degrees Celcius, $\epsilon$=the emissivity value of the target, $R_T$=the total infrared radiation from the target in British thermal units per hour per feet squared, $\sigma$ is the Stefan-Boltzman constant equal to $1.816 \times 10^{-8}$, and $T_R$ is the temperature of the target's surroundings reflecting off the surface of the target (extraneous radiation).

In most applications, however, the value of the emissivity of a given target object and the extraneous radiation will not be known. This is further complicated in situations where ambient conditions change, resulting in either an increase or a decrease in extraneous radiation. Using presently available non-contact radiation detector systems, if the emissivity of the target is not known then an emissivity value must be supplied to the system based on the total radiation received from the target object, which includes both the emitted and the extraneous radiation. Since the extraneous radiation is not eliminated from the reading of the total heat radiated from the target, these radiation detectors do not accurately detect the temperature of the targets, over a wide range of varying target temperatures.

Other types of infrared sensors employ a method where entered constants are used to offset and negate extraneous radiation based on two different temperature measurements, but these devices never determine an emissivity value for the target. As a result, complicated iteration processes must be used to establish a temperature value for the object. These iterations are time consuming and sometimes require complicated algorithms which may not be suitable for applications where target temperature must be determined quickly.

Another system for accommodating for the effects of emissivity and extraneous radiation uses a high reflectivity hemispherical cup placed against the surface of the target. Radiation is detected through an aperture in the cup and, by reflecting all emissions from the target back to the target, the cup causes the surface of the target to behave similar to a black body, the emissivity of which is nearly equal to unity regardless of the actual emissivity of the surface of the target. Since the cup must contact or come very close to the target, however, this system is not useful for irregularly shaped targets or situations where quick readings must be made on successive targets from a distance.

A better system would include a way to determine an emissivity value for the first of a series of targets having similar emissivity values and include means to resolve a value for the extraneous radiation. In this way, temperature values for subsequent targets could be more accurately established using the emissivity value determined for the first target, thereby eliminating the effects of extraneous radiation. At the present time, however, no such system exists.

SUMMARY OF INVENTION

It is therefore an object of the present invention to provide an improved non-contact infrared temperature sensing system.

It is a further object of this invention to provide such an improved non-contact infrared temperature sensing system which evaluates an emissivity value for the surface of an object whose temperature is to be determined.

It is a further object of this invention to provide such an improved non-contact infrared temperature sensing system which is accurate at even low thermal radiation levels.

It is a further object of this invention to provide such an improved non-contact infrared temperature sensing system which has the ability to quickly resolve even very small changes in thermal radiation.

It is a further object of this invention to provide such an improved non-contact infrared temperature sensing system which negates any extraneous radiation, thereby providing more accurate temperature value for a target over a wide range of target temperatures independent of extraneous radiation.

It is a further object of this invention to provide such an improved non-contact infrared temperature sensing system which is easily calibrated for a wide range of given applications.

It is a further object of this invention to provide such an improved non-contact infrared temperature sensing system which can be utilized in both continuous and intermittent applications.

This invention results from the realization that a truly effective non-contact infrared temperature sensing system can be accomplished by using values for heat radiation and an inputted temperature value for one target of a series of targets having similar emissivity values to calculate a value for the emissivity of the targets and then, using that emissivity value, computing, from the total heat radiated from subsequent targets, temperature values for the subsequent targets independent of any extraneous radiation. The calculation of the emissivity value can be accomplished by utilizing an inputted temperature for one target, the heat radiated from that target, and a value for the extraneous radiation; or alternatively, by utilizing values for the heat radiated and temperatures inputted from a target at two different temperatures. In either case, derivations of the Stefan-Boltzman equation can be used to calculate the emissivity value and the temperature of the extraneous heat radiated from the targets, and it can also be used to compute temperature values for subsequent targets independent of any extraneous radiation.

This invention features a non-contact infrared temperature sensing system which determines temperature values for a series of targets all having a similar emissivity value by automatically calculating an emissivity value for the targets based on the sensed total heat radiated from a target, an inputted temperature value for one target of the series, and a temperature value determined for the extraneous radiation from the target. In this way, temperature values for subsequent targets are computed independent of the extraneous component of total radiation from the target.

In a preferred embodiment, an appropriately programmed control processing unit with a keyboard, display, and adjustment buttons, responsive to a remote infrared sensor, may sense the total heat radiated from a target, provide for inputting temperature values for targets for inputting emissivity values and values for the temperature of any extraneous radiation, for calculating temperature values and emissivity values based on derivations of the Stefan-Boltzman equation, for displaying temperature values, for adjusting temperature values, for determining the temperature of the sensor and providing alarms when computed temperature values are not within specified ranges.

Accordingly, values for the temperature of the targets, values for emissivity, and values for the temperature of extraneous radiation are automatically computed depending upon the input into the system including the total heat radiated from the targets, the temperature of the remote sensor, and any inputted temperature values, using derivations of the Stefan-Boltzman equation and an appropriately programmed control processing unit.

DISCLOSURE OF PREFERRED EMBODIMENT

Other objects, features and advantages will occur to those skilled in the art from the following description of a preferred embodiment and the accompanying drawings, in which.

Figure 1:
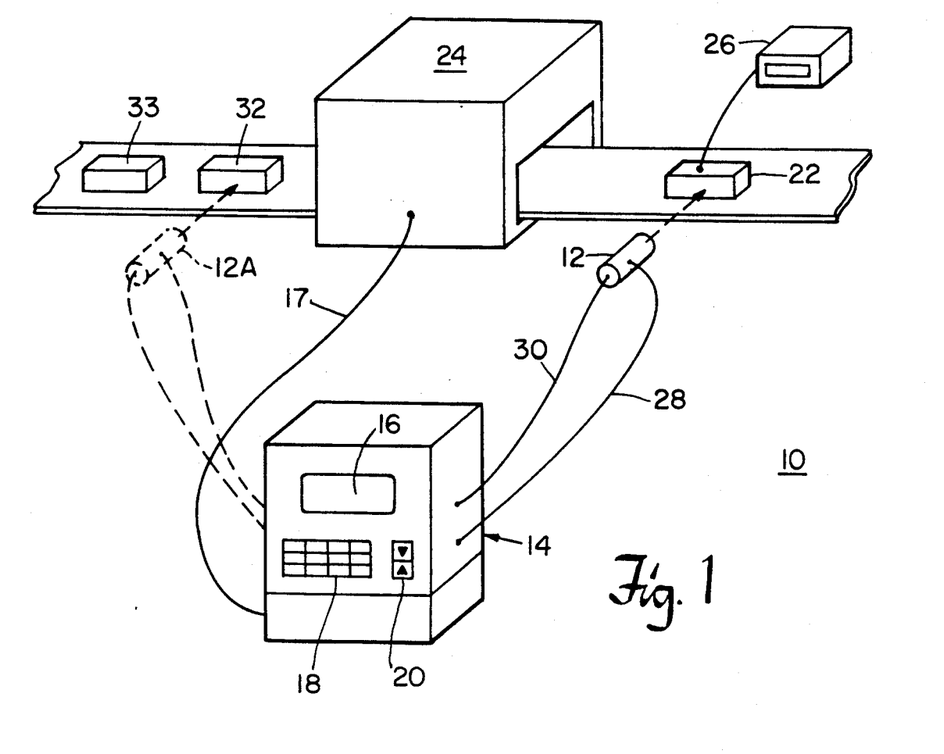
FIG. 1 is a block diagram of one embodiment of the non-contact infrared temperature sensing system according to this invention.

There is shown in FIG. 1 a non-contact infrared temperature sensing system 10 according to this invention including remote infrared sensor 12 which may include a thermopile 13 connected via cable 30 to a control processing unit 14 including display 16, keyboard 18, and adjustment buttons 20. Control processing unit 14 is further described in FIG. 2.

Control processing unit 14 is programmed as described below by those skilled in the art to achieve the infrared temperature sensing system of the present invention. Infrared sensor 12 senses the total heat radiated from a target and control processing unit 14 provides means for converting the sensed radiation to a value expressed, for example, in BTU/hr.ft$^2$. Infrared sensor 12 and control processing unit 14 can also be used to provide an inputted temperature value for targets. Or, keyboard 18 and adjustment buttons 20 can be used for this purpose. A temperature value for the extraneous radiation from a target can be determined by control processing unit 14 using methods currently known, including determining the temperature of sensor 12, for example, by a thermistor connected to sensor 12 that supplies a signal through cable 28. Control unit 14 may, as is further explained below, be used to calculate an emissivity value for a target in accordance with the present invention. Using that emissivity value and the total heat radiated by subsequent targets, control processing unit 14 can be used to compute a temperature value for subsequent targets independent of the extraneous component of radiation from the targets, thereby achieving the non-contact infrared temperature sensing system of the present invention. Finally, control processing unit 14 can include means for controlling the temperature of oven 24 via cable 17.

Target object 22 of successive targets 22, 32 and 33, all having the same emissivity, is shown just after it exits oven 24. Target 22 emits radiant heat which is sensed by infrared sensor 12. Control processing unit 14 provides means for inputting a temperature value for target 22 via keyboard 18. In a preferred embodiment, control processing unit 14 may actually compute and show at display 18 a temperature value for target 22 based on the radiation sensed by infrared sensor 12. This display temperature value may then be adjusted via keyboard 18 or adjustment buttons 20. Contact thermometer 26 may also be used to provide a temperature value of target 22 to be inputted via keyboard 18 or adjustment buttons 20 and received by control processing unit 14. Control processing unit 14 may also determine the temperature of sensor 12 via connecting cable 28 using a thermistor connected to the infrared sensor.

Figure 2:
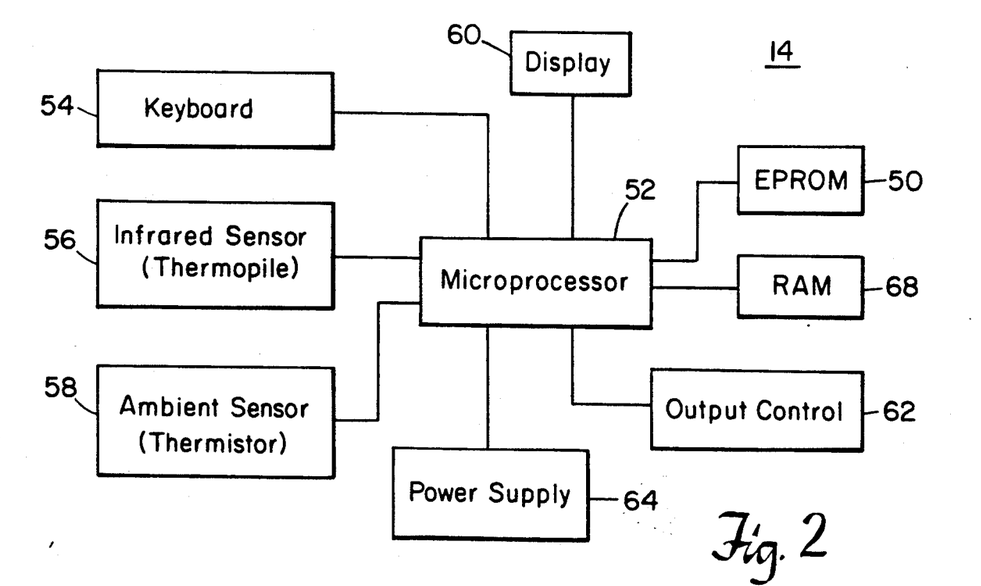
FIG. 2 is a block diagram of the control processing unit of the non-contact infrared temperature sensor system of FIG. 1.

The foregoing is accomplished by certain electronic elements present in control processing unit 14, FIG. 2. Erasable Programmable Read Only Memory, "EPROM" 50, such as a Texas Instruments 128K part no. 27C128-2JL, ALOP9114, may contain logic further described in FIGS. 3-6 for the present invention, and is connected to microprocessor 52 which also processes information from keyboard input 54, infrared sensor input 56 and ambient sensor 58. Microprocessor 52 provides output to display 60 and output controller 62. Power supply 64 is also shown, as well as Random Access Memory 68 which may store information processed by microprocessor 52.

Figure 3:
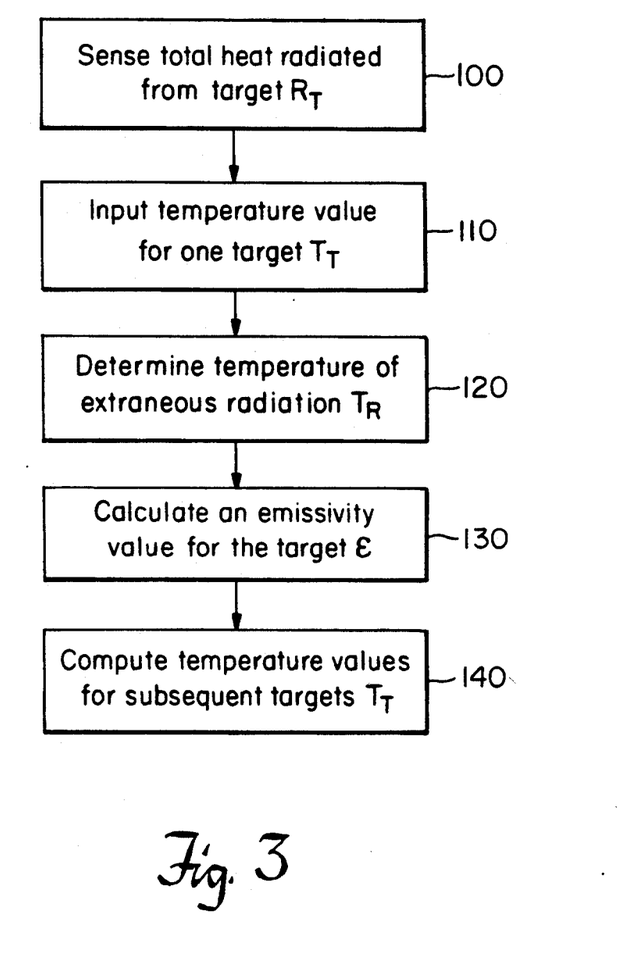
FIG. 3 is a block diagram of a general routine for implementing the present invention.

Turning to FIG. 3, which explains the basic operation of one embodiment of the infrared temperature sensing system of the present invention, the total heat radiated from a target, $R_T$, is sensed, block 100, in a preferred embodiment by infrared sensor 12, FIG. 1, and an input temperature value $T_T$ for target 22 is entered, block 110. The temperature of the extraneous radiation, $T_R$, is then determined, block 120, FIG. 3, and an emissivity value, $\epsilon$, is calculated, block 130. Finally, temperature values for subsequent targets, $T_T$, are computed, block 140.

Turning again to FIG. 1, infrared temperature sensing system 10 according to the present invention may also be used to sense the heat radiated from another target 32, of similar emissivity value to target 22 but at a different temperature than target 22. In this embodiment, sensor 12A, shown in phantom, is sensing the heat radiated from target 32, which is at a different temperature than target 22 since it has yet to pass through oven 24.

Figure 4:
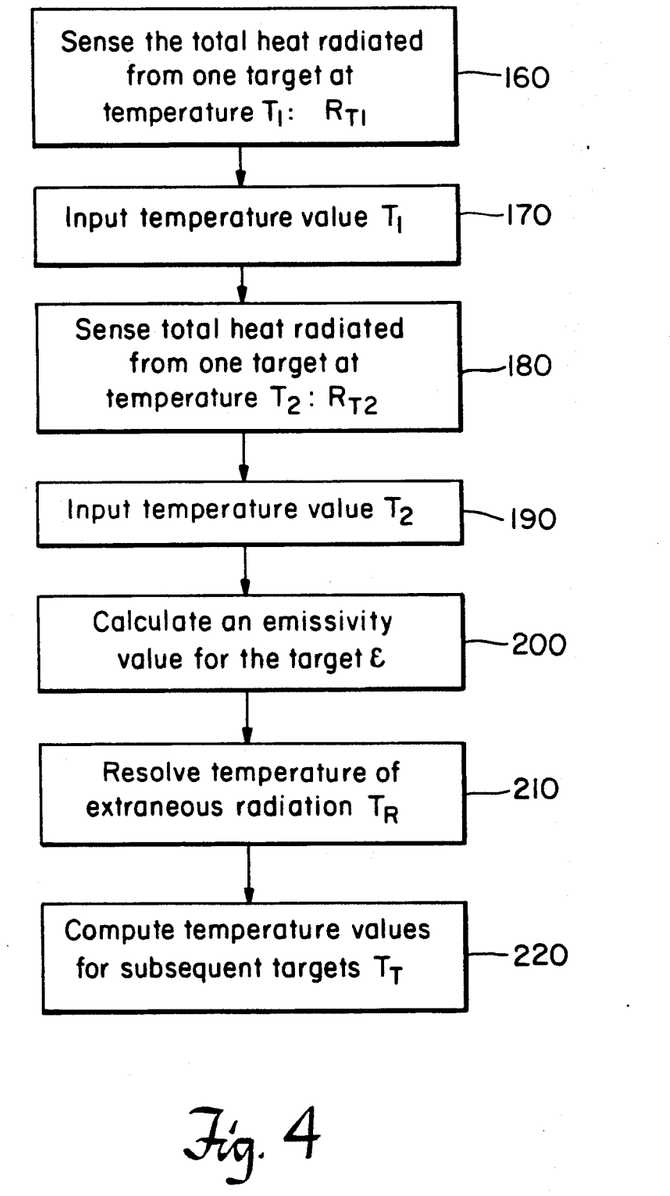
FIG. 4 is a more detailed block diagram of a routine for implementing the present invention using two inputted temperature

In this embodiment, then, the total heat radiated, $R_{T1}$, from one target at temperature $T_1$, block 160, FIG. 4, is sensed, for example by infrared sensor 12, FIG. 1. The value for the temperature of this target, $T_1$, is then inputted, block 170. Also, the total heat radiated, $R_{T2}$, from a target at temperature $T_2$, such as target 32 of FIG. 1, is sensed, block 180, and a temperature value, $T_2$, for this target is inputted, block 190. Using this information, an emissivity value, $\epsilon$, is calculated, block 200, and a temperature value for the extraneous radiation, $T_R$, is resolved, block 210. Finally, temperature values for subsequent targets, $T_T$, are computed, block 220.

The programming of the control processing unit 14, FIG. 1, in a preferred embodiment can be best explained by reference to FIG. 5 in conjunction with FIG. 1. Targets 22, 32 and 33 of FIG. 1 will all have a similar emissivity value for one specific application of the non-contact infrared temperature sensing system of the present invention. For example, targets 22, 32, and 33 may be loaves of bread which are baked in oven 24. Target 22 has exited oven 24 and it may be desirable to establish a "correct" temperature, for quality assurance purposes, for target 22 as it exits oven 24. The infrared temperature sensing system of the present invention may be then calibrated for this application as further explained below and used to monitor the temperature of subsequent targets 32 and 33 as they exit oven 24.

Figure 5:
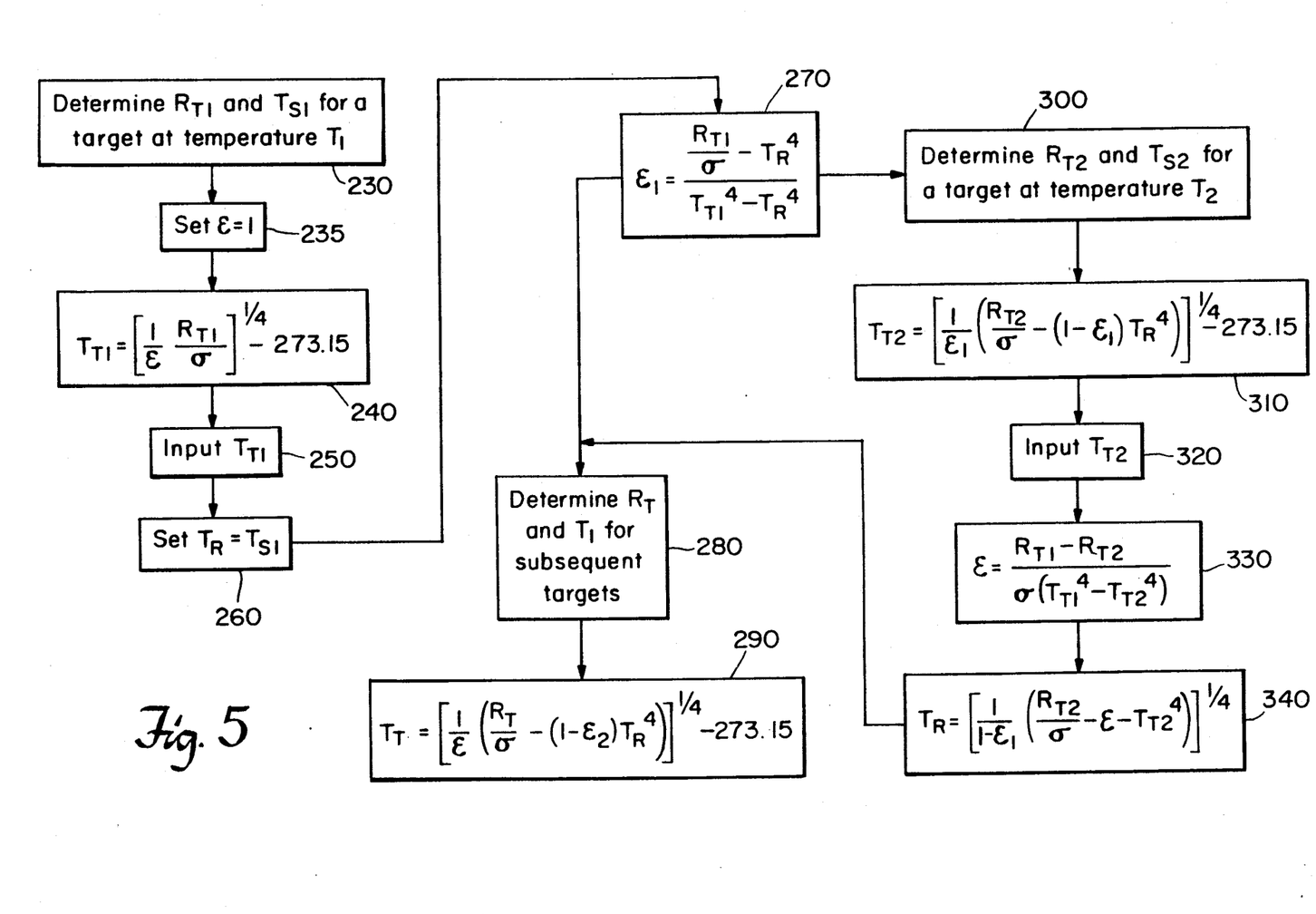
FIG. 5 is a more detailed block diagram of a routine for implementing the present invention showing, in a preferred embodiment, the use of derivations of the Stefan-Boltzman equation to accomplish the present invention.
Figure 6:
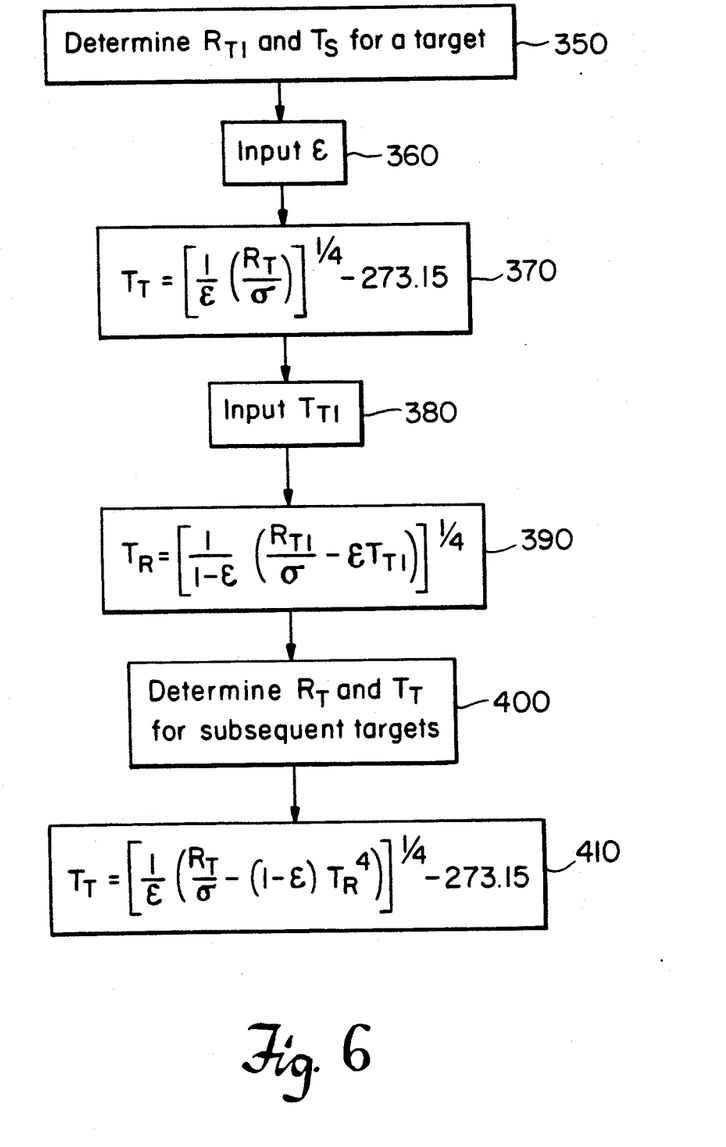
FIG. 6 is a detailed block diagram of a routine for implementing the present invention when an emissivity value is supplied to the system.

This is accomplished by determining $R_{T1}$, the total heat radiated from a target at temperature $T_1$, block 230, FIG. 5. Also, a value for the temperature of the sensor, $T_{S1}$ is determined, block 230. $R_{T1}$ and $T_{S1}$ may be determined by infrared sensor 12 of FIG. 1 used in conjunction with control processing unit 14, but this is not a limitation of the present invention. $R_1$ and $T_{S1}$ could be determined by other means including other non-contact infrared temperature sensing systems. Next, a value for the temperature of the target $T_T$ is calculated, block 240, based on an emissivity value of 1 shown in block 235, FIG. 5. This may be accomplished by using a variation of the Stefan-Boltzman equation:

$$T_T = \left\{ \frac{1}{\epsilon} \left( \frac{R_T}{\sigma} - (1-\epsilon)T_R^4 \right) \right\}^{\frac{1}{4}} - 273.15$$

where $T_T$=the temperature of the target in degrees Celsius, $\epsilon$=the emissivity value of the target, $R_T$=the total infrared radiation from the target in British thermal units per hour per feet squared, $\sigma$ is the Stefan-Boltzman constant equal to $1.816 \times 10^8$, and $T_R$ is the temperature of the target's surroundings reflecting off the surface of the target (extraneous radiation). The EPROM 50 of control processing unit 14, FIG. 2, may be programmed by those skilled in the art to evaluate $T_T$ based on the Stefan-Boltzman equation, in a preferred embodiment.

Since the emissivity is set to 1, block 235, the temperature of the target can be easily calculated based on the value of $R_{T1}$ determined at block 230 as is shown in block 240. In block 250, input temperature $T_{T1}$ is entered. This may be done using thermometer 26, FIG. 1, and inputting the temperature sensed via keyboard 18 into control processing unit 14.

Next, $T_R$ is set equivalent to $T_{S1}$, block 260, FIG. 4, and an emissivity value is calculated using the Stefan-Boltzman equation shown in block 270. This may be done automatically by an appropriately programmed control processing unit 14, FIG. 1. In one embodiment, the temperature of subsequent targets, $T_T$, block 280, may then be determined based on the $R_T$ value for these subsequent targets and the emissivity value calculated at block 270 as is shown in block 290. $R_T$ for the subsequent targets may, in a preferred embodiment, be determined by control processing unit 14 using remote sensor 12, and $T_T$ will be automatically calculated by control processing unit 14 programmed to automatically calculate the equation shown in block 190. $T_T$ may be shown in display 16 for quality assurance monitoring.

In another embodiment, an $R_{T2}$ value and a $T_{S2}$ value for a target at a second temperature, $T_2$, is determined, block 300, FIG. 4, and a temperature value for the target is calculated using the emissivity value calculated at block 270 as shown in block 310. In a preferred embodiment, this is accomplished as described above by using remote sensor 12A, FIG. 1, and control processing unit 14 to determine $R_{T2}$ and $T_{S2}$ of target 32 which has yet to enter oven 24 and is therefore at a different temperature than target 22. The value for the temperature of the target at the second temperature, $T_{T2}$, is then inputted, block 320, and an emissivity value is calculated, block 330, based on $R_{T1}$, $R_{T2}$, $T_{T1}$, and $T_{T2}$. Again control processing unit 14, FIG. 1, may be used to accomplish these parameters. The temperature of the extraneous radiation, $T_R$, is then computed, as is shown in block 340. Values for $R_T$ and $T_T$ for subsequent targets are then determined, block 280, by the equation shown in block 290. In this way, since an emissivity value for the targets has been calculated, the non-contact temperature sensing system of the present invention detects temperature values for targets independent of the extraneous radiation. Also, a hemispherical cup need not be placed on the targets to create an artificial environment, thereby disrupting operations. Once an emissivity value is calculated for a series of targets, the infrared temperature sensing system of the present invention detects temperature values for subsequent targets of similar emissivity values without the need to resort to complicated and time-consuming iteration procedures.

By way of illustration, using the infrared temperature sensing system 10, FIG. 1, programmed in this manner, an operator may aim remote infrared sensor 12 at target 22 which has just exited oven 24, and the infrared temperature sensing system 10 will show at display 16 a temperature of, for example, 313.2° F. This will have been automatically calculated by the infrared temperature sensing system 10 by setting the emissivity value for target 22 at 1.0, and $T_R = T_S$. Infrared temperature sensing system 10 will automaticallly determine that the total heat radiated from the target, $R_{T1}$, is 617.4 BTU per hour per ft$^2$ and a $T_S$ value, for example, of 77.0° F. The operator may then adjust the displayed value of 313.2° F. via keyboard 18 or adjustment buttons 20 and input a temperature of 350° F. This may be the target's temperature as determined by independent means, for example a thermometer, or it may be a temperature value which the operator considers "correct". Alternatively, the operator could leave the temperature value at 313.2° F., as it will not matter once an emissivity value is calculated for a series of targets because any errors between computed temperatures and the actual temperature of the targets will be thereafter consistent. That is, independent of the extraneous radiation, it can always be accurately determined when the monitored temperature of subsequent targets deviates from the inputted temperature which the operator considers to be correct.

This is accomplished when the control processing unit computes an emissivity value based on $T_{T1}$ equal to the 350° F. value and $R_{T1}$ equal to 617.4, using the equation shown in block 270, FIG. 5, resulting in an emissivity value of 0.7899. The operator may then replace the first target with an identical target that is cooler, for example, by aiming infrared sensor 12A, FIG. 1, at target 32 which has yet to enter oven 24, or by aiming infrared sensor 12A at a target in the same location as target 22 but at different temperature then target 22. The infrared temperature sensing system 10 will display a temperature of 118.2° F., for example, at display 16, based on the emissivity value calculated at block 270, FIG. 4. The value of $R_{T2}$ is sensed by infrared sensor 12, FIG. 1, and resolved via control processing unit 14 and the $T_R$ value equal to $T_S$, block 260, FIG. 4. This is automatically accomplished by the equation shown in block 310, FIG. 4. The operator may then adjust display 16 via keyboard 18 or adjustment buttons 20 to input $T_{T2}$ equal to, for example, 95° F., which he may believe to be a correct value of the temperature of target 32, inputted at block 320, FIG. 5. Control processing unit 14, now computes a new emissivity value and the reflected radiation temperature values based on these parameters using the equations of blocks 330 and 340 of FIG. 4. The non-contact infrared temperature sensing system 10, according to this invention, is now able to determine the temperature of subsequent targets 32 and 33, FIG. 1, as they exit oven 24 independent of the extraneous component of radiation from the targets using the equations shown in block 280 and 290 of FIG. 5.

In another embodiment, an emissivity value may actually be inputted for the targets. $R_{T1}$ and $T_S$ are determined for one target, block 350, FIG. 6, and a value for the emissivity is inputted at block 360. The temperature of that target is then computed using the equation shown in block 370, $T_{T1}$ is inputted, block 380, and a temperature for the extraneous radiation, $T_R$, is computed using the equation shown in block 390. In this way, the temperature for subsequent targets is computed, block 400, by the equation shown in block 410.

Finally, display 60, FIG. 1, can show these computed temperature values and control processing unit 14 can, after having stored the inputted temperature, determine when the displayed temperature deviates by a certain percentage from the inputted temperature. This can be accomplished by programming control processing unit 14 appropriately to receive input for desired deviation values, and control processing unit 14 may also be engineered to show, at display 60, when the computed temperature deviates from the input temperature. Alternatively, control processing unit 14 may provide audible alarm messages, or as previously described, may automatically adjust oven 24.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A non-contact infrared temperature sensing system for determining temperature values for a series of targets all having a similar emissivity value comprising:
    infrared means for sensing the total heat radiated from one said target;
    means for inputting a temperature value for said one target;
    means for determining a value extraneous radiation from said one target;
    means, responsive to said infrared means for sensing the total heat radiated from the target, the inputted temperature of the target, and the value for the extraneous radiation from the target, for calculating an emissivity value for said one target; and
    means, responsive to said infrared means for sensing and to the calculated emissivity value, for computing, for each subsequent target whose heat radiation is detected by said infrared means for sensing, a temperature value for each said subsequent target dependent on the emitted component of radiation, and independent of the extraneous component of radiation.

2. The non-contact infrared temperature sensing system of claim 1 in which said infrared means for sensing includes a thermopile.

3. The non-contact infrared temperature sensing system of claim 2 in which said means for inputting a temperature value includes means, responsive to said thermopile, for resolving a temperature value for said one target based on an emissivity value equal to unity.

4. The non-contact infrared temperature sensing system of claim 3 further including means for displaying the said resolved temperature value.

5. The non-contact infrared temperature sensing system of claim 4 further including means for adjusting said displayed temperature value.

6. The non-contact infrared temperature sensing system of claim 1 in which said means for inputting a temperature value for said one target includes means for displaying a temperature value and means for adjusting said displayed temperature value.

7. The non-contact infrared temperature sensing system of claim 1 in which means for determining a temperature value for extraneous radiation includes means for establishing a temperature value for said infrared means for sensing, and means for setting the temperature value for said extraneous radiation equal to said temperature value for said means for sensing.

8. The non-contact infrared temperature sensing system of claim 7 in which said means for calculating an emissivity value for said one target is responsive to said means for setting said temperature value for said extraneous radiation equal to said temperature value for said infrared means for sensing.

9. The non-contact infrared temperature sensing system of claim 1 further including means for storing values for said sensed total heat radiated from a target, said inputted temperature value, said value for said extraneous radiation, and said calculated emissivity valve.

10. The non-contact infrared temperature sensing system of claim 1 further including means for displaying said computed temperature value for each said subsequent target.

11. The non-contact infrared temperature sensing system of claim 1 further including means for indicating when said computed temperature value for each said subsequent target deviates from said inputted temperature value.

12. A non-contact infrared temperature sensing system for determining temperature values for a series of targets all having a similar emissivity value comprising:
infrared means for sensing the total heat radiated from one said target;
means for inputting a temperature value for said one target at a first temperature and for inputting a temperature value for said one target at a second temperature;
means, responsive to said infrared means for sensing, and the inputted temperature values, for calculating an emissivity value for said series of targets;
means, responsive to the means for sensing, to at least one of said inputted temperature values, and to said calculated emissivity value, for resolving, for each subsequent target whose heat radiation is detected by said infrared means for sensing, a value for extraneous radiation from each subsequent target; and
means, responsive to said means for resolving, for computing for each said subsequent target whose heat radiation is detected by said infrared means for sensing, a temperature value for each said subsequent target.

13. The non-contact infrared temperature sensing system of claim 12 in which said infrared means for sensing includes a thermopile.

14. The non-contact infrared temperature sensing system of claim 13 in which said means for inputting a temperature value for said one target at a said first temperature includes means, responsive to said thermopile, for resolving a temperature value for said one target at said first temperature based on an emissivity value equal to unity.

15. The non-contact infrared temperature sensing system of claim 14, further including means for displaying said resolved temperature value.

16. The non-contact infrared temperature sensing system of claim 15 further including means for adjusting said displayed temperature value.

17. The non-contact infrared temperature sensing system of claim 13 further including means for establishing a temperature value for said thermopile.

18. The non-contact infrared temperature sensing system of claim 17 in which said means for inputting a temperature value for said one target at a said second temperature includes means for computing an emissivity value based on a value for said extraneous radiation equal to said established temperature value for said thermopile.

19. The non-contact infrared temperature sensing system of claim 18 in which said means for inputting a temperature value for said one target at a second temperature further includes means, responsive to said thermopile, to said means for establishing a temperature value for said thermopile, and to said computed emissivity value, for resolving a temperature value for said one target at a said second temperature based on a temperature value for extraneous radiation equal to said established temperature value for said thermopile.

20. The non-contact infrared temperature sensing system of claim 19 further including means for displaying said resolved temperature value for said one target at said second temperature.

21. The non-contact infrared temperature sensing system of claim 20 further including means for adjusting said displayed temperature value.

22. The non-contact infrared temperature sensing system of claim 12 further including means for displaying said computed temperature value for each subsequent target whose heat radiation is detected by said means for sensing.

23. The non-contact infrared temperature sensing system of claim 22 further including means for indicating when said displayed computed temperature value differs from said inputted temperature value for said one target at said second temperature.

24. The non-contact infrared temperature sensing system of claim 22 further including means for indicating when said displayed computer temperature value differs from said inputted temperature value for said one target at said second temperature.

25. A non-contact infrared temperature sensing system for determining temperature values for a series of targets all having a similar emissivity value comprising:
infrared means for sensing the total heat radiated from one said target;
means for inputting an emissivity for said one target and for inputting a temperature value for said one target;
means, responsive to said infrared means for sensing, said inputted emissivity value, and said inputted temperature value, for resolving, for each subsequent target whose heat radiation is detected by said infrared means sensing, a value for extraneous heat radiation from each said subsequent target.

26. The non-contact infrared temperature sensing system of claim 25 in which said infrared means for sensing includes a thermopile.

27. The non-contact infrared temperature sensing system of claim 26 further including means, responsive to said inputted emissivity value, and said sensed total heat radiated from said one target, for calculating a temperature value for each subsequent target.

28. The non-contact infrared temperature sensing system of claim 27 further including means for displaying said calculated temperature value.

29. The non-contact infrared temperature sensing system of claim 28 in which said means for inputting a temperature value for said one target further includes means for adjusting said displayed temperature value.

30. The non-contact infrared temperature sensing system of claim 25 further including means, responsive to said inputted emissivity value, to said sensed total heat radiated from said one target, and to said means for resolving, for computing, for each subsequent target whose heat radiation is detected by said infrared means for sensing, a temperature value for each said subsequent target.

31. The non-contact infrared temperature sensing system of claim 30 further including means for displaying the computed temperature value for each said subsequent target.

32. The non-contact infrared temperature sensing system of claim 31 further including means for indicating when said displayed temperature value deviates from said inputted temperature value by a certain percentage.

* * * * *